United States Patent
Abrams et al.

(10) Patent No.: US 10,657,505 B2
(45) Date of Patent: May 19, 2020

(54) DUAL MODE PAYMENT AND DISPLAY SYSTEM

(71) Applicant: Clover Network, Inc., Sunnyvale, CA (US)

(72) Inventors: Jacob Whitaker Abrams, Mountain View, CA (US); Nagalakshmi Rajagopal, Sunnyvale, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 16/046,001

(22) Filed: Jul. 26, 2018

(65) Prior Publication Data
US 2020/0034806 A1 Jan. 30, 2020

(51) Int. Cl.
| | |
|---|---|
| *G06Q 40/00* | (2012.01) |
| *G06Q 20/10* | (2012.01) |
| *G06F 3/0488* | (2013.01) |
| *G06F 3/147* | (2006.01) |
| *G06Q 20/22* | (2012.01) |
| *G06Q 20/04* | (2012.01) |

(52) U.S. Cl.
CPC ......... *G06Q 20/102* (2013.01); *G06F 3/0488* (2013.01); *G06F 3/147* (2013.01); *G06Q 20/223* (2013.01); *G06Q 20/04* (2013.01)

(58) Field of Classification Search
CPC ......... G06Q 20/04; G06Q 20/10; G06Q 30/06
USPC .................................. 235/379, 380; 705/35
See application file for complete search history.

(56) References Cited

U.S. PATENT DOCUMENTS

| | | |
|---|---|---|
| 9,129,274 B1 | 9/2015 | Mocko |
| 9,589,428 B2 | 3/2017 | Edwards |
| 9,965,116 B1 | 5/2018 | Wolter |
| 10,068,550 B1 * | 9/2018 | Chen ........................ G09G 5/10 |
| 2002/0153414 A1 | 10/2002 | Stoutenburg |

(Continued)

FOREIGN PATENT DOCUMENTS

| | | |
|---|---|---|
| KR | 20170090201 A | 8/2017 |
| WO | 2003088005 A2 | 10/2003 |
| WO | 2016018246 A1 | 2/2016 |

OTHER PUBLICATIONS

Chau et al. "Impact of Information Presentation Modes on Online Shopping: An Empirical Evaluation of a Broadband Interactive Shopping Service" 2000, Journal of Organizational Computing and Electronic Commerce, v. 10 n. 1, p. 1-20.*

(Continued)

*Primary Examiner* — Kelly S Campen
(74) *Attorney, Agent, or Firm* — Daylight Law, P.C.

(57) ABSTRACT

A dual mode payment interface device has a touch display and alternatively operates in a first mode and a second mode. The first mode provides access to a merchant system interface (MSI) on the touch display and provides access to a customer system interface (CSI) on the touch display. The second mode provides access to a CSI on the touch display and does not provide access to the MSI on the touch display. The system also includes a merchant display device having a second touch display. The merchant display device provides access to the MSI on the second touch display. The system also includes a wire that provides a communicative connection between the dual mode payment interface device and the merchant display device. The second mode is enabled by the communicative connection.

8 Claims, 6 Drawing Sheets

(56) References Cited

U.S. PATENT DOCUMENTS

| | | |
|---|---|---|
| 2002/0156683 A1 | 10/2002 | Stoutenburg et al. |
| 2004/0114766 A1* | 6/2004 | Hileman ................. G06Q 30/06 380/278 |
| 2009/0055266 A1* | 2/2009 | Brody ................. G06Q 30/0264 705/14.61 |
| 2010/0216396 A1* | 8/2010 | Fernandez ........... G06Q 20/102 455/41.1 |
| 2011/0047036 A1* | 2/2011 | Foran-Owens ...... G06Q 20/204 705/17 |
| 2012/0010993 A1* | 1/2012 | Ferrara ................... G06Q 30/02 705/14.49 |
| 2013/0194377 A1* | 8/2013 | Humphries .............. H04N 7/15 348/14.08 |
| 2015/0001291 A1 | 1/2015 | Govindarajan et al. |
| 2016/0012462 A1 | 1/2016 | Langbein |
| 2016/0012465 A1* | 1/2016 | Sharp ..................... G06Q 20/18 705/14.17 |
| 2016/0026990 A1 | 1/2016 | Rezayee |
| 2016/0335675 A1* | 11/2016 | Kshirsagar ......... G06Q 30/0269 |
| 2017/0364888 A1 | 12/2017 | Bell |

OTHER PUBLICATIONS

P Huang, AC Boucouvalas—"Future personal e-payment: IRFM" Feb. 13, 2006 IEEE Wireless Communications,—vol. 13, Issue 1. pp. 60-66.*
Extended European Search Report dated Oct. 2, 2019 from European Application No. 19188476.6, 9 pages.

* cited by examiner

First mode of operation 202

Connection step 203

Second mode of operation 204

DUAL MODE PAYMENT AND DISPLAY SYSTEM

BACKGROUND

To complete a commercial transaction, information is required from both a merchant and a customer. In practice, the data is provided by the merchant and the customer directly to the electronic system facilitating the transaction, such as a point of sale (POS) system. The POS system must be configured to efficiently and securely receive this information. For example, a customer data input device could be physically separate from a merchant data input device, wherein the customer device is facing away from the merchant and the merchant only needs to use the merchant device. In this type of configuration, the transaction can be completed more efficiently because each user, both the merchant and the customer, has easy access to enter information to the POS system. However, this configuration might not meet the needs of all merchants. In some cases, a merchant may not want to incur the costs associated with providing a multi-device POS system, and could be willing to trade-off increased transaction efficiency for a less expensive POS system. For example, a POS system composed of a single data input device being shared by a customer and a merchant may complete the transaction more slowly than a POS system comprising more than one data input device, having eliminated the time required to move the device from one user to another, or switch between modes, but it will likely cost less than a multi-device system.

FIG. 1 illustrates one example of a customer system interface 100 and a merchant system interface 101 that can be used in a POS system to facilitate commercial transactions. The interfaces 100 and 101 can be software-controlled interfaces that communicate information to a user, in which the communication can be accomplished by a cathode ray tube display, a liquid crystal display, an inorganic or organic light emitting diode display, e-reader, or any other type of display device, with or without touch screen capability. The interfaces 100 and 101 guide the users to input information directly into the POS system. The data may be input using non-display devices, such as a keyboard or PIN pad, by the interface displays when configured to receive touch information, such as through a touch screen display, or by other means, such as audio information received by a microphone. In the example illustrated in FIG. 1, the customer system interface 100 has a customer system interface display 102, and the merchant system interface 101 has a merchant system interface display 103. The displays 102 and 103 can be touch screen displays that enable the users to simultaneously receive visual information from, and input touch information directly into, the interfaces 100 and 101.

When displays 102 and 103 are touch screen displays, the users can communicate with the interfaces 100 and 101 by providing touch information at specific points that are designated by virtual buttons 104, which can represent user commands, alphanumeric inputs, a virtual device such as a virtual keyboard or virtual pin pad 105, or other inputs specified by the interface software. In one example, users can receive commercial transaction information, such as individual items costs, payment totals, payment types, keyboard or PIN pad input displays, and other information, by virtual displays 106 on the displays 102 and 103. In another example, users can receive prompts provided by the interfaces 100 and 101 which help the users navigate the commercial transaction process. When customers and merchants are involved in a commercial transaction using a POS system, typically the customer will be the user that interacts with the customer system interface 100 and the merchant will be the user that interacts with the merchant system interface 101. One prompt that is commonly given to the customer is a prompt for payment information 107 such as a prompt for a personal identification number (PIN), and one prompt that is commonly given to the merchant is a prompt for payment total confirmation 108. Once the prompts 107 and 108 are properly addressed by the users, the commercial transaction can complete.

One type of POS system that is implemented widely in the retail space is a supermarket POS terminal with a payment device. A typical configuration includes a terminal that processes the commercial transaction, for use by a merchant, permanently connected to a payment device, for use by the customer during payment. The terminal can continuously provide access to a merchant system interface 101. The terminal is configured to receive and store item identification data from scanned items using a barcode reader system. The results of the item identification process are shown to the merchant and customer, simultaneously and in real time, by a terminal display screen. Then the terminal calculates the total price to be paid for the items and sends commands to the payment device to process a transaction for that amount. The payment device could include a PIN pad with a display screen, to facilitate the payment process by giving the customer a payment prompt. The payment device could continuously provide access to a customer system interface 100.

Another type of POS system includes a single POS terminal with a single display screen, wherein the customer and merchant share the terminal to complete the commercial transaction. In other words, the same display provides access to the merchant system interface 101 and the customer system interface 100, but at separate times. For example, a shared POS terminal can be placed in-between the merchant and the customer and rotated on a rotatable stand to face either user. When the customer is using the terminal to make a payment, the terminal can be rotated to face the customer to provide the payment interface to facilitate efficient and secure entry of the user's payment information to the system. When the customer is done, the terminal can be rotated back to the merchant. When the shared screen is accessible to the customer, the customer can be locked out of accessing the merchant interface, such as to change the total payment amount or conduct other illicit activity.

SUMMARY

The competitive choice for a POS system is based on continually evolving factors. Specifically, merchants that use a single POS system in multiple purchasing environments, or have rapidly developing and fluid customer needs, require configurable POS system to provide time efficient service within the changing constraints of the retail environment. Additionally, configurable POS systems allow for the economic flexibility that small business owners need to succeed, allowing for service or security improvement after core POS system functionality has been established for basic business operation.

Methods and systems are disclosed that provide enhanced flexibility to merchants in the configuration of POS systems with minimal expenditures. In a specific embodiment, a POS device can offer both a customer and merchant system interface in one mode of operation, and only one of those system interfaces in a second mode of operation. In a specific embodiment, a POS device with a single display enables a customer and merchant to conduct a commercial transaction using that single display, and that same POS device can optionally connect to another display device and enable the customer to conduct their portion of the transaction using the original display while the merchant conducts their portion of the transaction using the added display device.

A disclosed system includes a dual mode payment interface device having a touch display and alternatively operating in a first mode and a second mode. The first mode provides access to a merchant system interface (MSI) on the touch display and provides access to a customer system interface (CSI) on the touch display. The second mode provides access to a CSI on the touch display and does not provide access to the MSI on the touch display. The system also includes a merchant display device having a second touch display. The merchant display device provides access to the MSI on the second touch display. The system also includes a wire that provides a communicative connection between the dual mode payment interface device and the merchant display device. The second mode is enabled by the communicative connection.

A disclosed system includes a dual mode payment interface device having a touch screen display and alternatively operating in a first mode of operation and a second mode of operation. The first mode of operation provides access to a merchant system interface on the touch screen display and provides access to a customer system interface on the touch screen display. The second mode of operation provides a customer system interface on the touch screen display and does not provide access to the merchant system interface on the touch screen display. The system also includes a merchant display device having a second touch screen display. The merchant display device provides access to the merchant system interface on the second touch screen display. The system also includes a wire that provides a communicative connection between the dual mode payment interface device with the merchant display device. The system also includes a means for detecting the communicative connection, located on the dual mode payment interface device. The system also includes a means for enabling the second mode of operation in response to the means for detecting the communicative connection detecting the communicative connection.

A disclosed dual mode payment interface device comprises a touch screen display. The device also comprises a means for detecting a communicative connection with a merchant display device, located on the dual mode payment interface device. The device also comprises a means for enabling a second mode of operation in response to the means for detecting the communicative connection detecting the communicative connection. The dual mode payment interface device provides access to a merchant system interface on the touch screen display and provides access to a customer system interface on the touch screen display in a first mode of operation. The dual mode payment interface device provides access to the customer system interface on the touch screen display and does not provide access to the merchant system interface on the touch screen display in the second mode of operation.

DETAILED DESCRIPTION

Methods and systems related to a dual mode payment interface device are disclosed. Disclosed devices can be used by users to facilitate commercial transactions, wherein the users comprise merchants, customers, and other authorized users. Commercial transactions can include the exchange of goods and services for legal tender or credit. Credit can be established with a credit card, a personal check, a credit account linked to a device, such as a smart phone, that communicates to the disclosed systems by near field communication (NFC) technology, or any other credit distribution system. Legal tender can be cash, coins, transferred by debit card, or represented by other means. Approaches disclosed herein include specific technical solutions to improve the configurability of systems that would otherwise be locked into a single mode of operation. Disclosed methods and systems comprising a dual mode payment interface device can involve a first mode, wherein the dual mode payment device is shared between the merchant and the customer, and a second mode, wherein the dual mode payment device is used by only the merchant or the customer. Various methods and systems for determining when the device should switch between these modes, and for how the device should switch between these modes are disclosed below.

Figure 2:
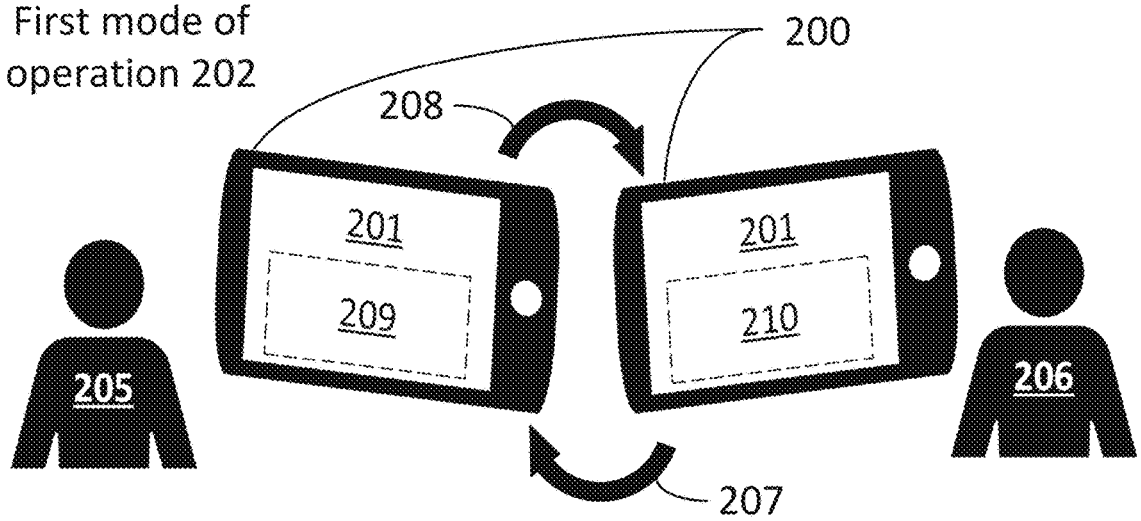
FIG. 2 illustrates a set of diagrams showing a first and second mode of operation for a POS device in accordance with this disclosure.
Figure 2:
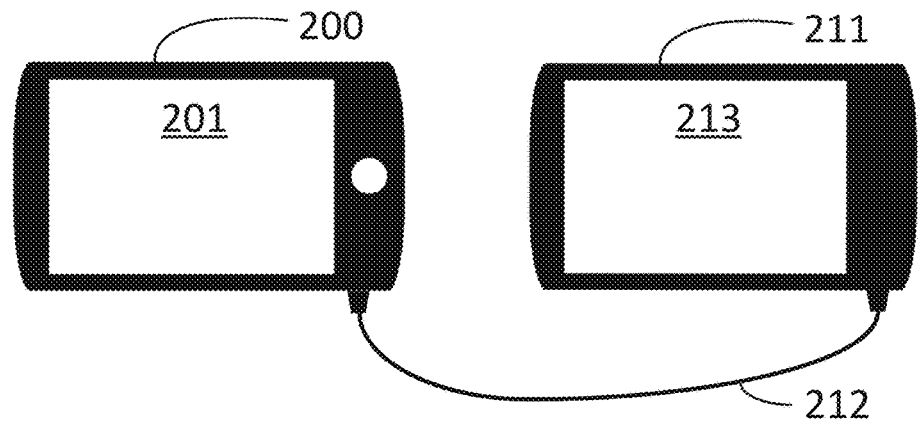
Figure 2:
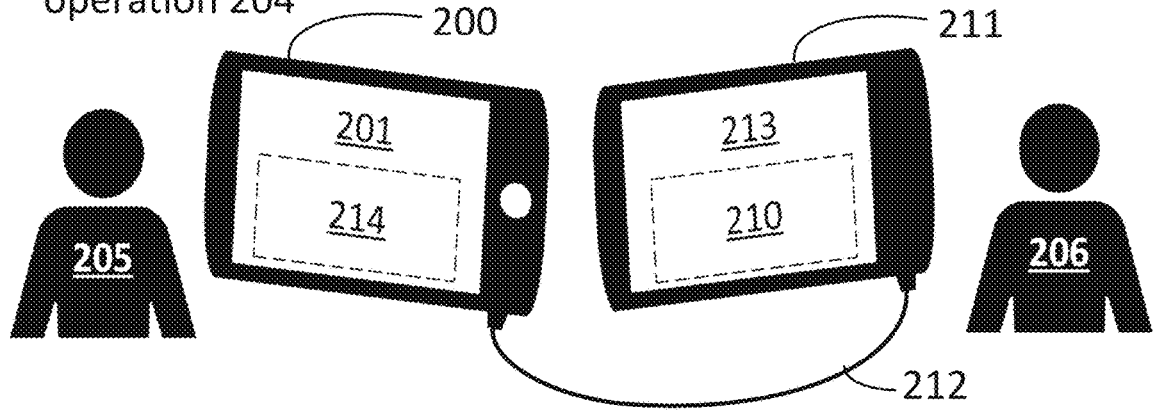

FIG. 2 illustrates a specific embodiment of a dual mode payment interface device 200 that is in accordance with teachings of the prior paragraph. FIG. 2 illustrates a system used for commercial transactions that can include dual mode payment interface device 200 having a first touch screen display 201. Dual mode payment interface device 200 has two modes of operation and is illustrated in three possible configurations. In the first configuration, device 200 operates in a first mode of operation 202. In the second configuration, device 200 undergoes a connection step 203. In the third illustrated configuration, device 200 operates in a second mode of operation 204.

In first mode of operation 202, the dual mode payment interface device 200 can operate without other devices such that users, which can include a customer 205 and a merchant 206, provide inputs to the dual mode payment interface device 200 at separate times. In the same example, the inputs can be provided to the system by the users using the touch screen display 201. In another example where the disclosed systems are operating in the first mode of operation 202, at one point in time the dual mode payment interface device 200 can be rotated to an orientation that is customer facing 207, while at another point in time can be rotated to an orientation that is merchant facing 208. In the same example, the switching between the customer facing 207 to merchant facing 208 orientations can happen any number of times and in any order. When multiple users can use the screen, the touch screen display 201 can be considered as a shared screen. In an embodiment illustrated in FIG. 2, the shared screen can enable the dual mode payment interface device 200, after switching to customer facing 207, to provide access to a customer system interface 209 on its touch screen display 201, and after switching to merchant facing 208, provide access to merchant system interface 210 on its touch screen display 201. Throughout this process, the dual mode payment interface device 200 is simultaneously guiding the users through the process of the commercial transaction with prompts shown on the interfaces. In one example, the customer system interface 209 can provide a prompt for payment information and the merchant system interface 210 can provide a prompt for a payment total confirmation.

Purchasers of the POS systems in accordance with the disclosures herein, such as merchant 206, could prefer the system comprising the dual mode payment interface device 200 in the first mode of operation 202 in certain circumstances. For example, when the space used for the commercial transaction is limited. The device used in the first mode of operation 202 can have a relatively small footprint and the fact that it can also be shared means that the total area required for the POS system is indeed limited. Another advantage of the system in the first mode of operation 202 is its relative low cost as only one single display device is required for system functionality. As such, the solution is a relative cheaper option compared to systems that require more than one device or display.

With the benefits of the first mode of operation 202 described above taken as a given, there are, concurrently with the cases discussed above, commercial transaction environments that can require added functionality from the dual mode payment interface device 200, that are in addition to what is described in the first mode of operation 202, to meet customer demand. In one example, a second display screen could be required to preclude the extra time needed to turn the dual mode payment interface device 200 between customer facing and merchant facing orientations. In another example, enhanced payment information security can be desired. Providing a dedicated screen to the customer 205 can help prevent the merchant 206 from seeing private payment information, such as a debit card PIN number, as well as other personal commercial transaction information, such as a customer-elected tip payment amount when paying for services where tip payments are expected. Providing a dedicated screen to merchant 206 can likewise prevent customers from illicitly accessing the merchant interface to change the amount of the transaction or access the merchant's core business information which could be accessible via the merchant system interface. For example, the merchant could have access to their inventory management system, price setting system, or confidential business information via the merchant system interface.

Systems and methods illustrated in FIG. 2 in the connection step 203 and the second mode of operation 204 disclose embodiments in which the dual mode payment interface device 200 can transition from a stand-alone device system configuration in the first mode of operation 202 to a multiple device system configuration in the second mode of operation 204. In other words, the system can be configured at the discretion of the system purchaser to utilize the advantages, as described above, of the first mode of operation 202, or of the advantages of the second mode of operation 204, providing three distinct benefits. Firstly, this configuration choice can be implemented at a lower total cost than the cost of acquiring two different systems that are permanently configured to the first mode of operation 202 and the second mode of operation 204. Second, the ability to transition to the second mode of operation only requires a marginal additional investment in that the payment processing and other complex functionality of the system is already provided by the initial device and the additional device is inexpensive because it provides a much more limited set of functionalities. Third, in accordance with the approaches disclosed below, transitioning the system from the first mode of operation 202 to the second mode of operation 204 can, by virtue of the novel design, be accomplished with very little technical skill and time, thus permitting system reconfiguration in almost any commercial transaction environment.

The connection step 203 provides an example of how the dual mode payment interface device 200 can be transitioned between the first mode of operation and the second mode of operation. In step 203, dual mode payment interface device 200 is connected to a merchant display device 211 by a wire 212 that provides a communicative connection between the two devices. The connectors at each end of the wire 212 can, but are not required to be, the same type of connector, and can follow known connection standards such as USB, USB-B, USB-C, Thunderbolt, Lighting, or HDMI. The wire end connectors can transmit and receive electrical signals to and from the devices, wherein the wire 212 itself can carry the electrical signals between end connectors. The merchant display device 211 can have a second touch screen display 213, wherein the second touch screen display 213 can provide access to the merchant system interface 210. In specific embodiments, the second mode of operation 204 is enabled by the communicative connection. The dual mode payment interface device 200 can detect the communicative connection and enable the second mode of operation 204 in response to detecting the communicative connection. The dual mode payment interface device 200 can include a means for detecting the communicative connection and a means for enabling the second mode of operation 204.

Enabling the second mode of operation can involve various aspects. Enabling the second mode of operation can include allowing dual mode payment interface device 200 to enter a mode in which it only displays the customer system interface on its own screen and transmits the information necessary to display the merchant system interface over the wire for ultimately presentation on the merchant display device 211. The means for enabling the second mode of operation can switch device 200 into this mode of operation automatically or provide a prompt requesting user confirmation that the mode of operation should be entered. In general, enabling the second mode of operation involves allowing the device to enter that mode either automatically or through some form of user input such as selection of the mode in a settings menu. Enabling the second mode of operation can also include causing device 200 to provide a customer system interface 209 on the touch screen display 201 of the dual mode payment interface device 200 while, concurrently, the device does not provide access to the merchant system interface 210 on the touch screen display 201. The dual mode payment interface device 200 can be programmed to lock-in to the second mode of operation 204 upon detecting the communicative connection. When locked-in, the dual mode payment device will only be capable of providing the customer system interface and will stay in that mode until the communicative connection is lost.

Figure 3:
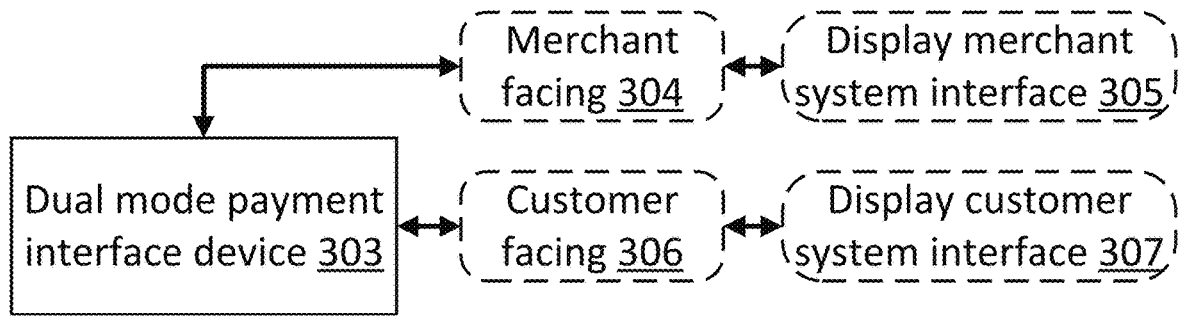
FIG. 3 illustrates a flow chart and block diagram for a set of systems and methods that provide details for the set of diagrams in FIG. 2 in accordance with this disclosure.
Figure 3:
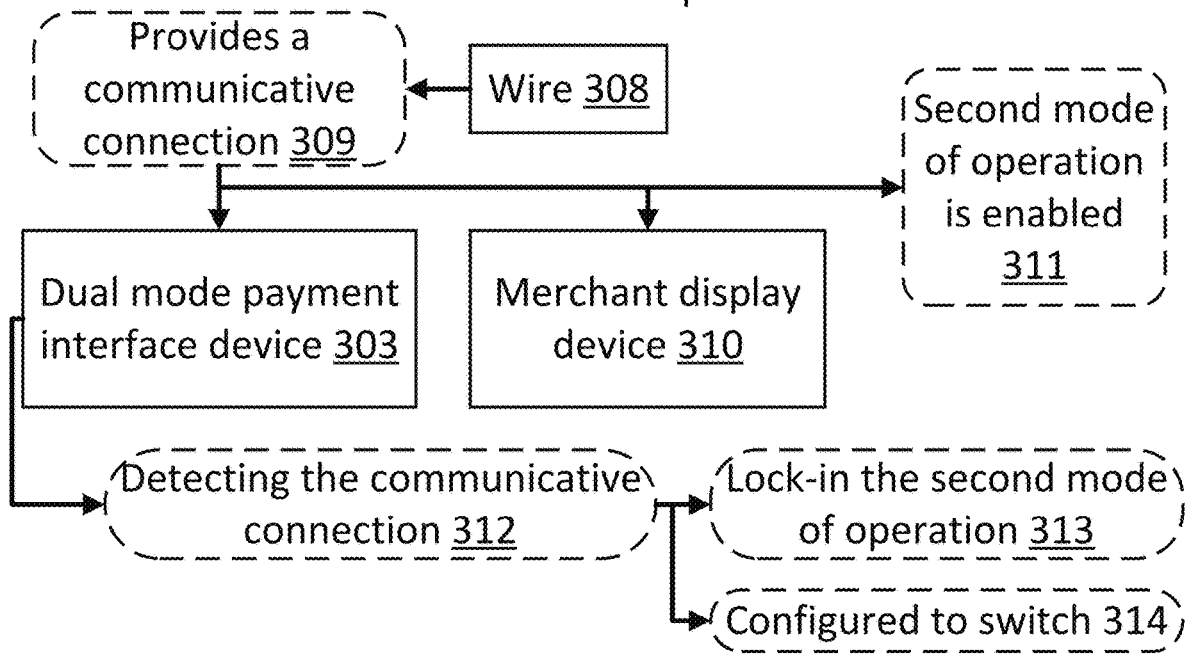
Figure 3:
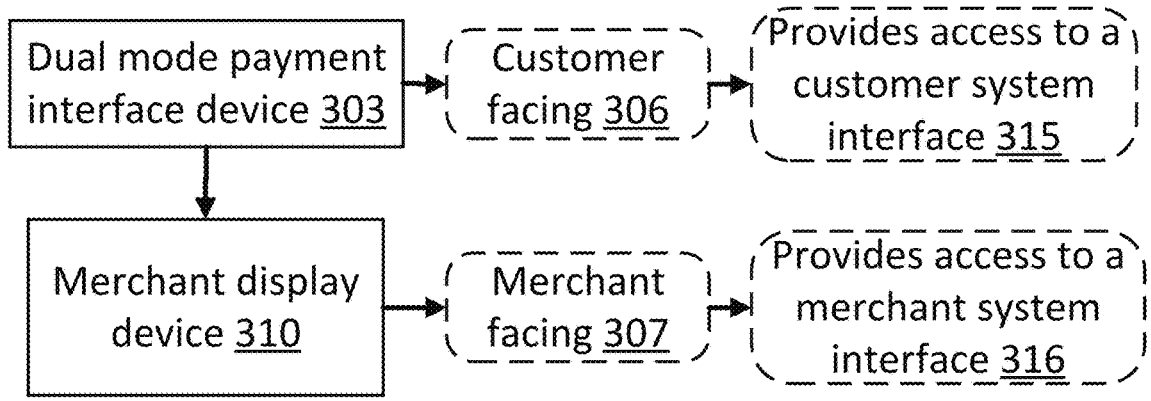

FIG. 3 provides a block diagram and flow chart demonstrating one example of a set of methods for using a dual mode payment interface device, as described in part previously with reference to FIG. 2, when it is used by users in the first mode of operation 300, when it is being connected to additional hardware and devices in a connection step 301, and when it is used by users in the second mode of operation 302. In this figure, rectangular blocks with solid borders can indicate devices comprising physical structure and electrical hardware, rectangular blocks with smoothed corners and broken borders can indicate method steps of the embodied systems and methods, and solid arrows that connect two blocks together can indicate a unidirectional or bidirectional communicative connection between, modification to, or enablement of, those blocks.

The connection step 301 can be considered as a subset of operational behavior of the disclosed systems while in the first mode of operation 300. In some embodiments, a dual mode payment interface device 303 will begin in the first mode of operation 300 wherein the customer and the merchant share the interface of the dual mode payment interface device 303 to proceed with the commercial transaction. The dual mode payment interface device 303 can be reoriented to become merchant facing 304, after which the interface can provide access to the merchant system interface 305 to show prompts for inputs, and other information, to the merchant. Alternatively, the dual mode payment interface device 303 can be reoriented to become customer facing 306, after which the interface can provide access to the customer system interface 307 to show prompts for inputs, and other information, to the customer. The reorientation of the device and the displaying of interfaces can happen any number of times and in any order.

A wire 308 provides a communicative connection 309 between a dual mode payment interface device 303 and a merchant display device 310 in the connection step 301 and, thereby, the second mode of operation is enabled 311. In one embodiment, when the dual mode payment interface device 303 and the merchant display device 310 are communicatively connected, the dual mode payment interface device 303 can detect the communicative connection 312. In one example, the dual mode payment interface device 303 is programmed to lock-in the second mode of operation 313 upon detecting the communicative connection 312. In one example, the dual mode payment interface device 303 is configured to switch 314 from the first mode of operation 300 to the second mode of operation 302 automatically upon detecting the communicative connection 312.

The dual mode payment interface device 303 can be in the second mode of operation 302. In one example, the dual mode payment interface device can be connected to the merchant display device 310, wherein the two connected devices can be oriented to be customer facing 306 and merchant facing 307, respectively. In the same example, the dual mode payment interface device 303 provides access to a customer system interface 315 on its touch screen display and does not provide access to the merchant system interface on its touch screen display. In the same example, the merchant display device 310 provides access to a merchant system interface 316 on its touch screen display.

While the aforementioned embodiments and described advantages of the specific disclosed systems and methods stand on their own, certain additional characteristics of the disclosed systems and methods, related to the security features, user ergonomics, and transaction efficiency, will now be described.

In specific embodiments, a dual mode payment interface device can be locked-in to the second mode of operation by the communicative connection for additional security. In these embodiments, the dual mode payment interface device can express the second mode of operation, and only the second mode of operation, while the communicative connection between the merchant display device and the dual mode payment interface device is detected. These approaches provide significant benefits in that the merchant operator of the merchant display device can remain confident that the dual mode payment interface is not being used to access the merchant system interface so long as the display of the merchant display device is presenting the merchant system interface. To this end, even if the system occasionally places the merchant display device in an idle state in which the screen is not active, the merchant display device can still receive a specific screen saver indicative of the communicative connection remaining active. Then, if the display of the merchant display device ever indicates that the communicative connection has been lost, the merchant will know to stop allowing customers to interact with the dual mode payment interface device and trouble shoot the system.

In specific embodiments, a dual mode payment interface can be conceptualized as the customer-facing device when it is operating in combination with the merchant display device, and the merchant display device can, of course, be conceptualized as an add-on merchant-facing device. In alternative approaches, the add-on device is a customer-facing device. However, using a device with a payment interface as the customer-facing device in the combined system offers significant benefits. For example, the add-on device can be a more basic piece of hardware that only provides a display and a way to receive commands instead of the complex hardware required to encrypt and secure payment information. Therefore, the system can be upgraded at lower cost than would otherwise be required. As another example, the combined system offers certain security benefits. Due to industry security requirements, such as those put forward by the payment card industry (PCI), payment information needs to be heavily secured at all phases of use during payment processing. For example, the information must be encrypted as soon as it is received by the system. In alternative approaches in which the add-on device is designed to receive payment information and transfer it to a payment information processing system on the main device, a complex system would need to be put in place to assure that the information was encrypted as it was first received and transferred to the peripheral. However, this requirement is avoided by having the main device be the customer-facing device when operating in the combined system because it is already equipped to securely receive and transmit payment information for processing by a remote approval system.

In specific embodiments, a dual mode payment interface device is configured to switch from the first mode of operation to the second mode of operation automatically upon detecting the communicative connection. For example, the operating system of the dual mode payment interface may include an event listener set to detect connection on the port designed for the wire to the merchant display device, and a routine that immediately instantiates a second display and beings transmitting information regarding the merchant system interface to that second display when a connection is formed by the driver operating the port. These approaches provide certain benefits in that the same device can quickly switch between modes as the immediate needs of the merchant's store changes. The dual mode payment interface device can also switch back to the first mode of operation with some degree of flexibility. However, given security concerns, in some approaches the display of the dual mode payment interface device will first present a request for a merchant unlock when switching back to the first mode of operation. The merchant unlock can require the entry of a merchant PIN or a physical key before reverting the dual mode payment interface device to the first mode of operation. The second mode of operation may commence with the presentation of a "Confirm" request on the display of the merchant display device via the wire and/or the display of the dual mode payment device. The second mode of operation may also commence with the presentation of a confirm request on the dual mode payment interface device before the dual mode payment interface device presents the customer system interface.

Figure 4:
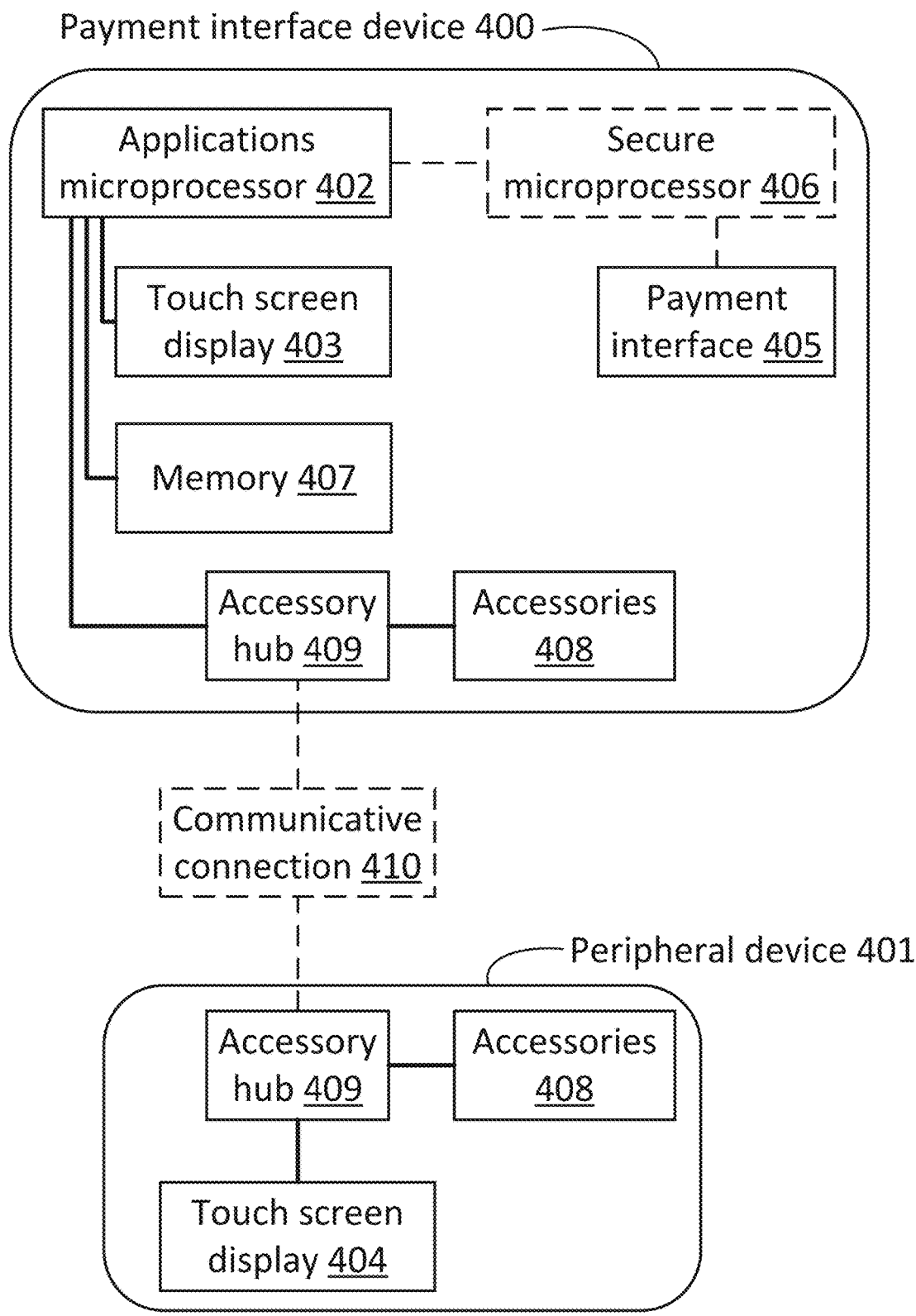
FIG. 4 illustrates a block diagram of a configuration of hardware modules on a payment interface device and a peripheral device connected by a communicative connection in accordance with this disclosure.

FIG. 4 illustrates a block diagram for a hardware configuration scheme that represents an embodiment of the systems and methods disclosed herein. FIG. 4 includes a payment interface device 400 and a peripheral device 401. In this figure, solid and dotted lines that connect two blocks indicate a direct and two-way communicative connection between those blocks, and blocks with dotted outlines indicate optional variations of the illustrated system. Lines with arrow heads indicate one-way communication between the blocks in the direction of the arrows.

Figure 1:
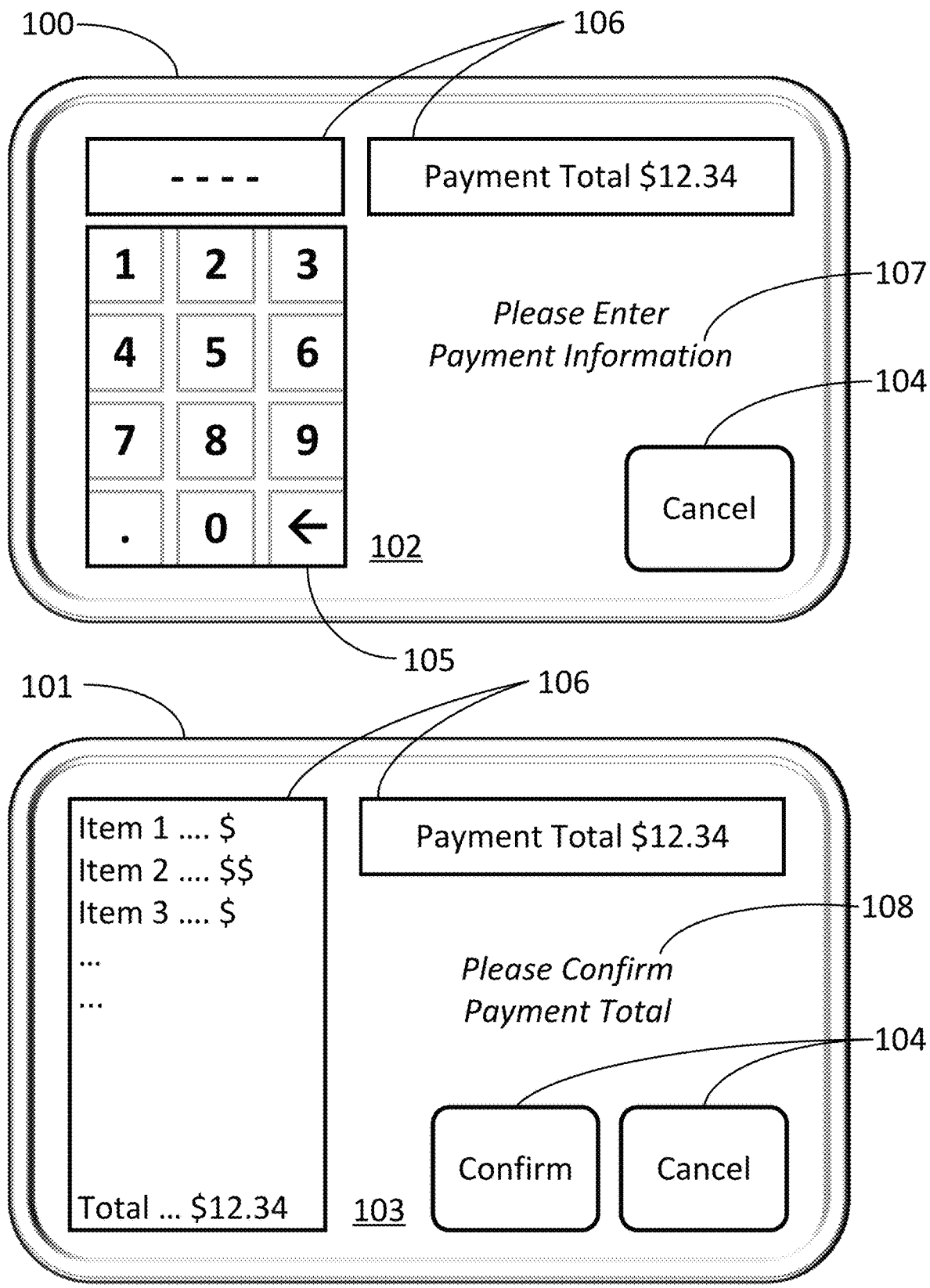
FIG. 1 illustrates a screen of a merchant system interface and a screen of a customer system interface in accordance with the related art.

In one embodiment, the payment interface device 400 can include an applications microprocessor 402 that can instantiate an operating system. As illustrated, the peripheral device 401 does not include a microprocessor. The operating system can be any type of operating system commonly used in the mobile devices, such as iOS, Android, Android Go, Tizen, BlackBerry, Windows Mobile, and other operating systems. In this embodiment, the operating system can control both: one system interface displayed on the payment interface device 400 touch screen display 403; and another system interface displayed on the peripheral device 401 touch screen display 404; wherein the system interfaces can operate as customer system interfaces and merchant system interfaces as described previously with reference to FIG. 1, or any other types of interfaces.

In one example where the Android operating system can be utilized for controlling the displays 403 and 404, the operating system can leverage native applications, such as those available in Android, version 8.0 and later, or third-party applications, to enable the applications microprocessor 402 to implement system interfaces across multiple displays. In one example, the applications microprocessor 402 can be a Qualcomm Snapdragon series microprocessor, or another mobile device processor commonly used for managing multiple displays. The touch screen displays 403 and 404 can optionally be augmented with other types of displays, such as those that do not have touch screen capability, including LED, LCD, e-paper, and other display types, and can optionally have connected data input devices, such as key pads, key boards, PIN pads, or other data input devices to augment the input of information by the users of the devices.

In one embodiment, the payment interface device 400 can have a payment interface 405. The payment interface can receive payment information as input, which includes account numbers, personal identification numbers (PINs), biometric information, passwords, or any other information that is used by a payment processor to authorize the transfer of funds from one entity to another. Common examples of payment information include 16-digit credit card numbers for credit card transactions and 4-digit PINs for debit card transactions. Means for receiving payment information include key pads for receiving PINs, bar code scanners (including QR code scanners), magnetic stripe readers (MSRs) for reading magnetically encoded account numbers, near field communication (NFC) readers for contactless payment processing, finger print readers, infrared surface or gesture analyzers, chip card readers, microphones for receiving auditory information, and other methods known in the industry. In one example, the payment interface device 400 can optionally include a secure microprocessor 406 to process payment information in a cryptographically secure manner. The devices that receive payment information generally also include injected payment keys that are used to encrypt payment information for transfer to a payment processor. In embodiments where a secure microprocessor 406 is present and connected to the applications microprocessor 402, the connection is configured such that in cases where secure information, such as payment information, is unencrypted, it cannot be communicated from the secure microprocessor 406 to the applications microprocessor 402.

In some embodiments, the payment interface device 400 can include an electronic memory 407 to store data, programs, and applications for the applications microprocessor 402 to process, including operating systems and interface systems. In one example, the memory 407 can be volatile memory device such as dynamic random access memory, static random access memory, or other types of volatile memory commonly used in mobile devices. In another example, the memory 407 can be non-volatile memory device such as solid state hard disk, mechanically rotating hard disk, an optical disc, or other type of non-volatile memory commonly used in the industry.

In some embodiments, the payment interface device 400 and peripheral device 401 can include accessories 408 which add various types of functionality to the devices installed thereon. The accessories 408 of the payment interface device 400 and the peripheral device 401 can be the same, can have some in common and others specific to one device or the other, or can comprise different groups of accessories with no overlapping form or function. Examples of accessories commonly used in payment interface devices and display devices include image sensors, microphone devices, audio speakers, thumb print readers, mouse touchpads, and modems configured with wireless radios that can act as a transceiver for wireless communications of any standard type or frequency band, including such standards as the Wi-Fi/IEEE 802.11 series, EDGE, the EV-Do series, Flash-ODFM, GPRS, the HSPA standards, Lorawan, LTE, RTT, the UMTS series, WiMAX, 6LoWPAN, the Bluetooth series, IEEE 802.15.4-2006, Thread, UWB, Wireless USB, ZigBee, ANT+, and other standards.

In some embodiments, the accessories 408 can be connected to an accessory hub 409. In one example, the payment interface device 400 can have an accessory hub 409 and accessories 408, in which the accessories 408 are connected to an accessory hub 409, which is further connected to the applications microprocessor 402. In this example, the connections can be communicative connections and the applications microprocessor 402 can send information and individual instructions to the accessories 408 for their operation, such as a command to take a picture with an image sensor, as well as receive information from the accessories 408, such as receiving the picture taken with the image sensor to store in the memory 407. On the peripheral device 401, accessories 408 can interact with an accessory hub 409 using the same configurations and methods described for the payment interface device 400.

In some embodiments, the accessories hub 409 can have permanent connections to internal components such as accessories 408, as well as non-permanent connections to devices external to the device on which the accessory hub 409 is installed. In a first example, a non-permanent, optional, external connection can be constructed between the payment interface device 400, or the peripheral device 401, and other devices using electrical data cables with end connectors chosen by the standard associated with the data cable type. In this example, the data cable type can be any type, and the accessory hub 409 can have data cable end connector receptors that accept the type of data cable end connector used, which can include ethernet, token ring, coaxial, optical fiber, serial cable, Cat2, telephone cable, universal serial bus (USB) cable, or other data cable type used for sending digital information. Alternatively, the data cable can be specific to the communication of video information, in which case the types of data cables can include s-video, component video, DVI, HDMI, display port, CoaX-Press, and MHL, and other video cable types. In a second example, a non-permanent, optional, external connection can be constructed between the payment interface device 400, or the peripheral device 401, using a wireless connection. In this example, the connected devices have modems with wireless transceivers that operated and connect using standards and protocols as described above, in which the modem can be one of the accessories 408. In a third example, a non-permanent, optional, external connection can be constructed between the payment interface device 400 and the peripheral device 401 using a communicative connection 410. The communicative connection 410 can be constructed between the accessory hubs 409 of the respective devices, using either of the data cable or wireless methods described previously. With reference back to FIG. 3, communicative connection 410 can be provided by wire 308 and provide the service of step 309 described above.

In some embodiments, the payment interface device 400 and the peripheral device 401 can have specific accessories 408, and can make use of one or more communicative connections 410, to facilitate an efficient and secure commercial transaction through the use of the accessories 408 and communicative connections 410. One example of a method that facilitates an efficient and secure commercial transaction is described previously with reference to the method steps in FIG. 3. In one example, the touch screen display 403 can be used to provide a customer with access to a customer system interface, instantiated by the applications microprocessor 402 operating system, that can provide any type of customer-relevant commercial transaction information, commands, or prompts to the customer, such as guiding the customer through the necessary commercial transaction steps and providing the customer with a prompt for payment information. The customer can use the payment interface 405 in response to the prompt for payment information to make a payment using a compatible method, such as credit card, NFC, and others described previously. In another example building upon the configuration of the previous example, a communicative connection 410 can be established with the peripheral device 401 through the accessory hubs 409 of both devices, enabling the applications microprocessor 402 operating system to implement a multi-screen display scheme. The multi-screen display scheme can further provide access to a merchant system interface by displaying, on touch screen display 404 of the peripheral device 401, a merchant system interface to a merchant. The merchant system interface can provide any type of merchant-relevant commercial transaction information, commands, or prompts to the merchant, such as a prompt for payment total confirmation to authorize the commercial transaction. The utilization of the touch screen display 404 by the applications microprocessor 402 through the accessory hub 409 of the peripheral device 401 renders the touch screen display 404 a specific species device in the genus of accessories 408 devices. In another example, the communicative connection 410 can be established between other types of devices, such as a printer device, to the accessory hubs 409 of the payment interface device 400 or of the peripheral device 401. Through the communicative connections 410, the applications microprocessor 402 can send commands to, provide prompts to, receive inputs from, and provide user interfaces to the displays of, the other types of devices, in addition to any other type of control afforded by the capabilities of the applications microprocessor 402. As illustrated, the applications microprocessor 402 could also have a more direct connection to provide display information to the touch screen display 404 that bypasses accessory hub 409. A specific example in which communicative connection 410 includes both communication pathways is disclosed below with reference to FIG. 6.

While the aforementioned embodiments and described advantages of the disclosed systems and methods stand on their own, certain additional characteristics of the disclosed systems and methods, related to the device configurations and their use modes, will now be described.

In some embodiments, a commercial transaction process between a customer and a merchant can be carried out using only a payment interface device. In one example, the payment interface device can be used in a POS configuration wherein the merchant is the sole user. The merchant can input sale item and customer information into the payment interface device using the touchscreen display displaying the merchant system interface, and can receive the physical representation of payment from the customer, which can be cash, a credit card, or any method described previously, and can conclude the transaction with the printing of a receipt for the customer to physically sign, or the entry of a PIN on a PIN pad, for payment authorization. In one example, the payment interface device can be used in a POS configuration wherein the device is shared between the customer and the merchant. In this example, the payment interface device can be rotated between users as described previously with reference to the first mode of operation in FIG. 2 in order to input transaction information in a fast and secure fashion.

In some embodiments, a commercial transaction process between a customer and a merchant can be carried out beginning with a payment interface device and, at a later time, a peripheral device can be connected to the payment interface device with a communicative connection. In one example, the payment interface device is a dual mode device. In a first mode, the payment interface device can operate as described in the previous paragraph. In another example, while the payment interface device is in a first mode, a communicative connection can be made between the payment interface device and a peripheral device, causing the payment interface device to enter into a second mode. In this example and while in the second mode, the user can use the payment interface device to complete their portion of the commercial transaction while the merchant can use the peripheral device to complete their portion of the commercial transaction. Continuing in the example and while in the second mode, the applications processor instantiates an operating system which can generate and control multiple display screens and show a merchant system interface and a customer system interface on the peripheral device and the payment interface device respectively.

Figure 5:
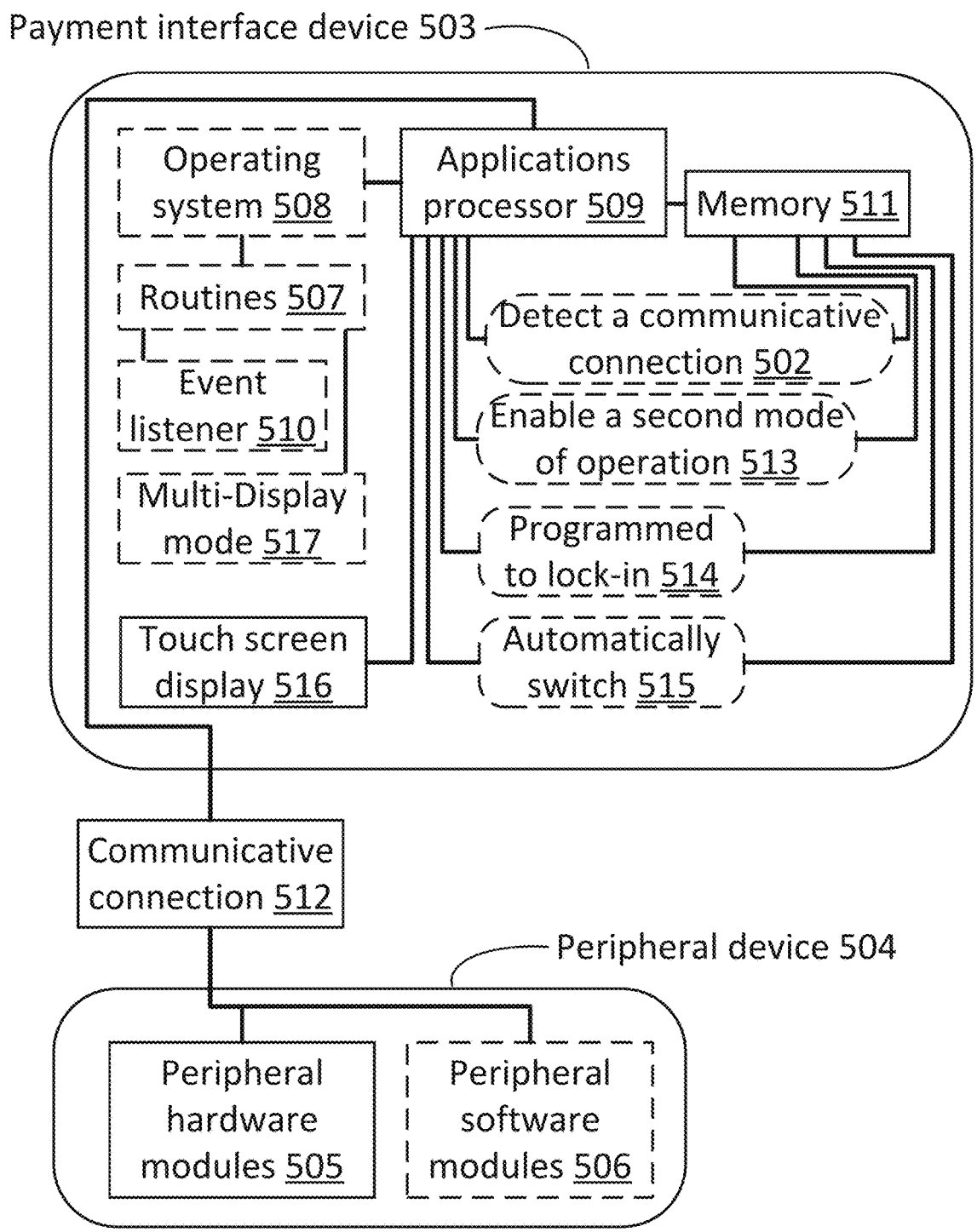
FIG. 5 illustrates a block diagram of a configuration of hardware modules and software modules on a payment interface device and a peripheral device connected by a communicative connection in accordance with this disclosure.

FIG. 5 illustrates a block diagram for configurations of hardware modules and software modules that can be used to describe the means for detecting and the means for enabling mentioned above. The means for detecting can serve to detect a communicative connection 502 between a payment interface device 503 and a peripheral device 504, and other devices. The means for enabling can serve to enable the second mode of operation of the payment interface device 503, and other device modes. In this figure, solid lines that connect two blocks indicate a direct and two-way communicative connection between those blocks, rectangular blocks with solid borders indicate hardware modules whereas rectangular blocks with broken borders indicate software modules, and rectangular blocks with broken outlines and rounded corners indicate a process step used for the means for detecting or the means for enabling that can receive, generate, or transmit information that can travel along the block connections and through any number of blocks.

In some embodiments, the means for detecting can be located on and implemented by the payment interface device 503, while using and being contingent upon peripheral hardware modules 505 and peripheral software modules 506 on the peripheral device 504. The modules 505 and 506 can contain secure or unique identifiers that can be recognized by the payment interface device 503. In a first example, the means for detecting can include specific kinds of peripheral hardware modules 505, or subcomponents thereof, containing device type identifiers, such as an accessory port type, an accessory hub type, a memory device type, a display device type, a speaker type, an image sensor type, a light sensor type, a thermal sensor type, a microphone type, a wireless modem type or type of any subsystem thereof, a data input device type, or another device type. The device type can be represented by any combination of type identifiers, such as the device company brand, manufacturing ID, industry standard, model number, or other hardware identifiers common to microelectronic devices. In a second example, the means for detecting can include specific kinds of peripheral software modules 506, such as algorithms, operating systems, routines, applications, programs, code sequences, or other computer language-based identifiers. Specific examples of peripheral software modules 506 can include a device driver for any of the devices listed above, a software module stored in a memory, a non-compilable data file, a cryptographic key, or an embedded security signature.

In some embodiments, the means for detecting can include hardware modules and software modules on the payment interface device 503. The means for detecting can include hardware modules such as a port on applications processor 509 that is dedicated for connections to peripherals, or a peripheral hub, that is designed to detect an electrical connection and inform an operating system 508 of the connection. The means for detecting can include routines 507 built into an operating system 508 of the payment interface device 503, wherein the routines 507 can be coded using the source code recognized by the operating system 508, the operating system 508 is instantiated by an applications processor 509, and the operating system 508 can be stored in a memory 511. If the operating system 508 were an Android operating system, the routines 507 could be written in Java, C++, Python, or some other language recognized by the Android operating system standards. The routine 507 can include an event listener 510 designed to detect when the portion of the operating system 508 responsible for interfacing with the peripheral device 504 can detect a communicative connection 502. The event listener 510 can be targeted to monitor and identify peripheral hardware modules 505 and peripheral software modules 506, such as a specific port into which a peripheral device 504 could be connected to communicate with the operating system 508 on the payment interface device 503 through a communicative connection 512. In this example and using an Android operating system 508 as an example, the event listener 510 can register to receive broadcasts from the PeripheralManager system service. The means for detecting can include registering an event listener 510 with the operating system 508, transmitting a peripheral device 504 connection by the PeripheralManager, and receiving that broadcast at the payment interface device 503 with the registered event listener 510. Instead of the PeripheralManager, the means for detecting could alternatively include the Android Hardware Abstract Layer (HAL) operating in combination with the Linux operating system. In particular, the Linux USB driver in the kernel of an applications processor, such as applications processor 509, could detect a USB connection and inform the Android HAL of the connection. The means for detecting could alternatively include the Android USBManager. In these implementations, the means for detecting would involve routines coded at the level of the Android operating system interfacing directly with the USB protocol via a port on the applications processor, such as applications processor 509 as opposed to communicating via the USB driver of the kernel.

In some embodiments, the means for detecting, using any of the embodiments described above with reference to FIG. 5, can enable a change of mode of operation of the payment interface device 503. The payment interface device 503 can begin operation in a first mode of operation. Subsequently, the means for detecting can detect a communicative connection 502, and the means for enabling can enable a second mode of operation 513 in response to the means for detecting. An applications processor 509 can be programmed to detect a communicative connection 502 and the programming can be stored in a memory 511. The means for enabling can likewise, as illustrated, include programming stored in memory 511. The means for enabling can include instructions to enable the second mode of operation 513. This programming may enable a user to confirm that the second mode of operation should be entered via the display of a prompt for that confirmation or via unlocking a menu option to receive that confirmation. The means for enabling can include instructions to lock-in 514 the second mode of operation wherein the programming to lock-in can be implemented by the applications processor 509 and stored in the memory 511. The means for enabling can additionally or alternatively include instructions to automatically switch 515 from the first mode of operation to the second mode of operation upon the detecting of a communicative connection 502 with the means for detecting. The programming to automatically switch 515 can be stored in a memory 511.

In some embodiments, the means for enabling can include hardware and software modules on the payment interface device 503 that serve to enable a second mode of operation 513 for the payment interface device 503 and the peripheral device 504. The means for enabling can be designed to trigger the creation of multiple system interfaces by the payment interface device 503, using multi-display operating system 508 capabilities. In one example, when multiple system interfaces are created, one system interface can be shown on a touch screen display 516 on the payment interface device 503, and another system interface can be shown on a peripheral hardware modules 505 touch screen display on the peripheral device 504. The means for enabling can include routines 507 built into the operating system 508 of the payment interface device 503. The routines 507 can be coded using the source code recognized by the operating system 508. For example, if the operating system 508 were an Android operating system the routines can be written in Java, C++, Python, or some other language. The routines could be written at the level of the Android HAL or at a lower level of the operating system.

In specific embodiments, the routines 507 can use a multi-display mode 517, native to operating system 508 versions of Android 8.0 and later, to utilize commands to control the dimensions, pixel resolution, orientation, and other characteristics of the system interfaces to display properly on multiple displays. The multi-display mode 517 can enable the applications processor 509, in response to detecting a communicative connection 502 and enabling a second mode of operation 513, to generate a customer system interface on the touch screen display 516 on the payment interface device 503, and to generate a merchant system interface on a peripheral hardware modules 505 touch screen display on the peripheral device 504 by sending the merchant system interface display information to the peripheral device 504 through the communicative connection 512. The applications processor 509 can receive inputs through the merchant system interface displayed on the peripheral hardware modules 505 touch screen display, indicated by touch information provided on the touch screen display by the user, and sent to the applications processor 509 through the communicative connection 512. If the system is programmed to automatically switch 515, the displays can be generated automatically and as soon as the detection of a communicative connection 502 occurs. If the system is programmed to lock-in the second mode of operation 514, the displays can be generated as described in the first example and the mode of operation cannot change in response to inputs provided by a user using the payment interface device 503, such as a customer interacting with the payment interface device 503 through a customer system interface. Alternatively, if the system is programmed to lock-in 514, the displays can be generated as described in the first example and the mode of operation can change in response to inputs provided by a user using the payment interface device 503 only if the user enters a secure command to unlock, such as a merchant interacting with the payment interface device 503 through a customer system interface.

Figure 6:
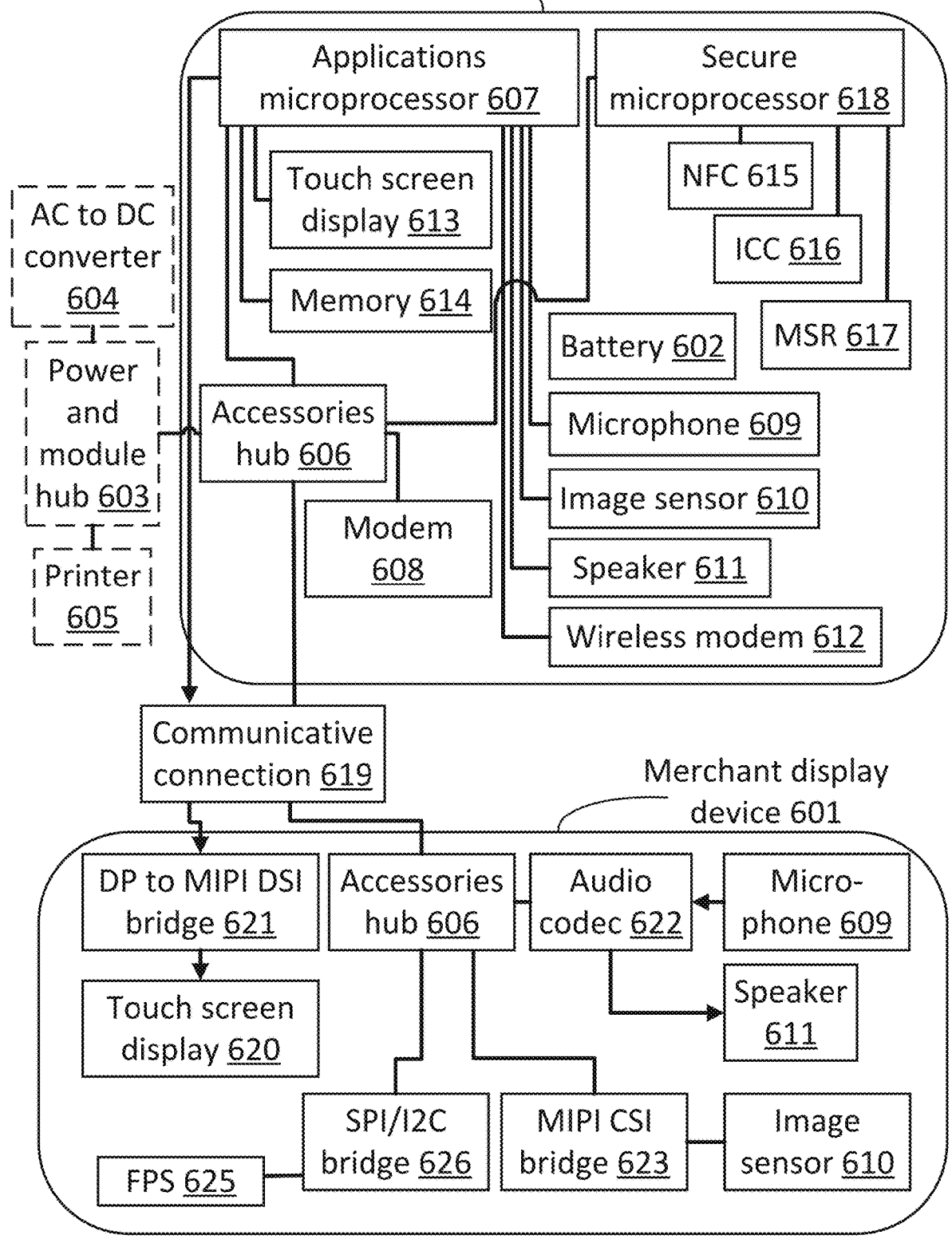
FIG. 6 illustrates a block diagram of a configuration hardware modules on a dual mode payment interface device and a merchant display device connected by a communicative connection in accordance with this disclosure.

FIG. 6 illustrates the configuration of hardware modules on a dual mode payment interface device 600 and a merchant display device 601 that is in accordance with systems and methods disclosed herein. In this figure, solid lines without arrows that connect two blocks indicate a direct and two-way communicative connection between those blocks, while solid lines with arrows that connect two blocks indicate a direct, communicative connection in the direction of the arrows. Additionally, rectangular blocks with solid borders indicate hardware modules and rectangular blocks with broken borders indicate hardware that is supplemental to, but not part of, the main system. Data, digital files, and device information can travel along the block connections and through the illustrated blocks.

In some embodiments, the dual mode payment interface device 600 can be used in a cordless configuration while powered by an internal battery 602. Alternatively, the dual mode payment interface device 600 can be powered by a power and module hub 603 connected to an alternating current (AC) to direct current (DC) converter 604 that is plugged into a standard wall electricity outlet. The battery 602 can be charged while the dual mode payment interface device 600 is powered by the power and module hub 603. The dual mode payment interface device 600 can print on paper media to produce documents, such as commercial transaction receipts, using a printer 605 that is connected to the dual mode payment interface device 600 through the power and module hub 603. The power and module hub 603 can connect to the dual mode payment interface device 600 using an on-board accessories hub 606, through which commands can be sent from the applications microprocessor 607 to peripheral devices, such as the printer 605 and the merchant display device 601, or to other internal hardware modules, such as a modem 608. In some embodiments, the dual mode payment interface device 600 has internal hardware modules that can enable features such as speech recognition through a microphone 609, image capture, video capture, and facial recognition with an image sensor 610, audio playback through a speaker 611, and wireless communication by a wireless modem 612, all of which can be connected directly to the applications microprocessor 607. In the embodiments above, the listed hardware modules can comprise any make, model, or type of device commonly used in mobile applications. For example, the battery 602 can be a lithium-ion battery, the accessories hub 606 can be configured to interface with other devices using USB connection standards, and the applications microprocessor 607 can be a Qualcomm Snapdragon microprocessor.

In some embodiments, a system comprising a dual mode payment interface device 600 with a touch screen display 613 and a memory 614 can operate in a first mode of operation, wherein a user, such as a merchant, can use the dual mode payment interface device 600 to carry out a commercial transaction. The touch screen display 613 can be of any size, wherein a display with a diagonal length of fourteen inches can be ideal for managing both the provided information and the information input tools. The memory 614 serves the applications microprocessor 607 in storing an operating system and programming needed to run the dual mode payment interface device 600 with connected peripheral devices. In one example, the applications microprocessor 607 can provide access to a merchant system interface on the touch screen display 613, wherein a merchant uses the merchant system interface to carry out a commercial transaction. When payment information must be provided to the system, the merchant can use any of the payment interfaces on the dual mode payment interface device 600, which can be, for example, a near field communications (NFC) interface 615, an integrated circuit card (ICC) interface 616, and a magnetic stripe reader (MSR) 617. Payment information provided by the methods and interfaces described here can be transferred to a secure microprocessor 618 for payment completion, wherein the unsecured applications microprocessor 607 does not gain access to unencrypted payment data and the secure microprocessor 618 has access to network resources of the modem 608 via the accessories hub 606. In one example, the secure microprocessor 618 can be a Broadcom StrataGX device, or any other cryptographically secure processor or microcontroller.

In some embodiments, a system comprising a dual mode payment interface device 600 with a touch screen display 613 and a memory 614 can operate in a first mode of operation, wherein more than one user, such as a customer and a merchant, can share the dual mode payment interface device 600 to carry out a commercial transaction. The transaction can carry out as described in the previous paragraph with the following exceptions. The touch screen display 613 can display a customer system interface to be used by the customer as well as a merchant system interface to be used by the merchant, as described previously with respect to FIG. 2. The switching of the system interfaces can be triggered by an input given to the dual mode payment interface device 600, for example, through an input to the touch screen display 613, through the receipt of payment information by one of the payment interfaces 615, 616, and 617, a verbal command received by the microphone 609, a facial recognition algorithm stored in the memory 614 and used by the image sensor 610, or another method. The customer system interface can be used by the customer to carry out the submission of payment information, thereby providing additional security to the payment information through removal of the merchant in this process step.

In some embodiments, the system can comprise a dual mode payment interface device 600 in a first mode of operation connecting to a merchant display device 601 through a communicative connection 619, and, for example, switching to, automatically switching to, or locked-in to a second mode of operation. In the second mode of operation, the commercial transaction can be performed by a customer using a customer system interface shown on touch screen display 613 on the dual mode payment interface device 600 and a merchant using a merchant system interface shown on the touch screen display 620 on the merchant display device 601. In these embodiments, the functionality provided by second mode of operation can be controlled by the applications microprocessor 607 to the dual mode payment interface device 600 using methods described above. The connection between touch screen display 613 and applications microprocessor 607 can be a two directional connection between two dedicated ports on applications microprocessor 607 with one port being a dedicated touch controller input port and the other port being a dedicated display port. Additionally, control of the merchant display device 601 can be accomplished with the communicative connection 619 comprising two separate wires. The first wire can be used by a unidirectional connection from the applications microprocessor 607 directly to the touch screen display 620. The wire can be a display peripheral wire. This connection can transition through a display port (DP) and mobile industry processor interface (MIPI) display serial interface (DSI) bridge 621 that sends the merchant system interface. In other embodiments where touch screen display 620 is DP compatible, bridge 621 can be removed. The second wire can be used by a bi-directional connection from the applications microprocessor 607 to the remaining merchant display device 601 hardware modules by way of the accessories hub 606 on both devices 600 and 601. The wire can be a USB cord. Touch data from touch screen display 620 can be routed back to applications microprocessor 607 via bridge 626 and the accessory hubs 606 in order for the merchant inputs to the merchant system interface to affect the transaction.

Audio information, such as a prompt for payment total confirmation, can be sent to the merchant using the speaker 611 on the merchant display device 601. Data sent to this end can be processed through an audio codec 622 to be converted to a format usable by the speaker 611. Audio data to be received by the applications microprocessor 607 from the merchant display device 601, such as voice commands, can originate from the microphone 609 thereon and be formatted by the audio codec 622 for sending to the accessories hub 606.

The merchant display device 601 can include an image sensor 610 for image capture, video capture, and facial recognition, for example to unlock the device with a cleared facial recognition identity, with a MIPI camera serial interface (CSI) to USB bridge 623 for image data conversion when sending image data to the applications microprocessor 607.

The merchant display device 601 can be equipped with a security finger print scanner (FPS) 625. The FPS 625 can be put in communication with the accessories hub 606 on the merchant display device 601 by a serial peripheral interface (SPI)/inter-integrated circuit (I2C) to USB bridge 626.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The dual mode payment interface device computer can be a terminal, a smartphone, a point of sale terminal, a tablet, or any other device that has a display and a means for securely receiving payment information. The merchant display device can be a terminal, a smartphone, a point of sale terminal, a tablet, or any other device that has a display and can be communicatively connected to the dual mode payment interface device. Although examples in the disclosure are generally directed to a merchant display device providing access to a merchant system interface for a merchant and a dual mode payment interface device providing access to a customer system interface for a customer, the same approaches could be utilized to grant access to a customer system interface for a customer on the merchant display device and to grant access to a merchant system interface to a merchant on the dual mode payment interface device. These and other modifications and variations to the present invention may be practiced by those skilled in the art, without departing from the scope of the present invention, which is more particularly set forth in the appended claims.

What is claimed is:

1. A system, comprising:
  a dual mode payment interface device having a touch screen display and storing instructions for operating in a first mode of operation and a second mode of operation;
  wherein the first mode of operation provides access to a merchant system interface on the touch screen display and provides access to a customer system interface on the touch screen display;
  wherein the second mode of operation provides access to the customer system interface on the touch screen display and does not provide access to the merchant system interface on the touch screen display;
  a merchant display device having a second touch screen display;
  wherein the merchant display device provides access to the merchant system interface on the second touch screen display;

a wire that provides a communicative connection between the dual mode payment interface device with the merchant display device;
a means for detecting the communicative connection, located on the dual mode payment interface device; and
a means for enabling the second mode of operation in response to the means for detecting the communicative connection detecting the communicative connection;
wherein the dual mode payment interface device is configured to switch from the first mode of operation to the second mode of operation and lock-in the second mode of operation upon:
(i) detecting the communicative connection with the means for detecting the communicative connection; and
(ii) enabling the second mode of operation with the means for enabling the second mode of operation in response to the means for detecting the communicative connection detecting the communicative connection.

2. The system of claim 1, wherein:
the customer system interface provides a prompt for payment information; and
the merchant system interface provides a prompt for payment total confirmation.

3. The system of claim 1, further comprising:
an applications microprocessor on the dual mode payment interface device;
wherein the dual mode payment interface device is programmed to:
instantiate, using the applications microprocessor, an operating system that controls both the customer system interface and the merchant system interface;
generate, using the operating system, a set of views for the merchant system interface in the second mode of operation; and
transmit the set of views to the merchant display device via the communicative connection.

4. The system of claim 3, further comprising:
a first peripheral port on the dual mode payment interface device; and
a second peripheral port on the merchant display device;
wherein the wire provides the communicative connection between the first peripheral port and the second peripheral port; and
wherein the merchant display device does not include a microprocessor.

5. The system of claim 1, wherein the means for detecting further comprise:
an applications microprocessor on the dual mode payment interface device;
wherein the dual mode payment interface device is programmed to:
(iii) instantiate, using the applications microprocessor, an operating system that controls both the customer system interface and the merchant system interface; and
(iv) detect the communicative connection with the merchant display device.

6. The system of claim 5, wherein:
the dual mode payment interface device is programmed to detect the communicative connection using an event listener registered with the operating system.

7. The system of claim 5, further comprising:
a secure microprocessor on the dual mode payment interface device; and
a hardware payment interface that is directly connected to the secure microprocessor and that is not directly connected to the applications microprocessor;
wherein the merchant display device is not connected to any hardware payment interfaces.

8. The system of claim 1, wherein:
the dual mode payment interface device is programmed to lock-in the second mode of operation upon detecting the communicative connection by:
(iii) instantiating a first view and a second view separate from the first view;
(iv) only displaying the merchant system interface on the first view; and
(v) only displaying the customer system interface on the second view.

\* \* \* \* \*